United States Patent [19]

Furuno

[11] Patent Number: 5,299,017
[45] Date of Patent: Mar. 29, 1994

[54] SCREEN FIXING DEVICE OF PROJECTION TYPE TELEVISION SYSTEM

[75] Inventor: Takashi Furuno, Tokyo, Japan

[73] Assignee: Pioneer Electronic Corporation, Tokyo, Japan

[21] Appl. No.: 794,120

[22] Filed: Nov. 15, 1991

[30] Foreign Application Priority Data

Nov. 20, 1990 [JP] Japan .................................. 2-316528
Dec. 14, 1990 [JP] Japan .................................. 2-402519

[51] Int. Cl.⁵ .......................... H04N 5/74; H04N 5/30; A47B 5/00
[52] U.S. Cl. ..................................... 348/786; 312/7.2; 248/918; 248/919; 348/787; 348/779; 348/383; 348/789
[58] Field of Search ............... 358/254, 237, 247, 248, 358/249, 229; 353/46, 47; 312/7.2; 248/917, 918, 919

[56] References Cited

U.S. PATENT DOCUMENTS

| | | | |
|---|---|---|---|
| 4,866,530 | 9/1989 | Kalua | 358/237 |
| 4,903,137 | 2/1990 | Wakasa | 358/254 |
| 5,119,271 | 6/1992 | Aoki et al. | 358/254 |
| 5,204,750 | 4/1993 | Ferraroni | 358/247 |

*Primary Examiner*—Edward L. Coles, Sr.
*Assistant Examiner*—Kimberly A. Williams
*Attorney, Agent, or Firm*—Kane, Dalsimer, Sullivan, Kurucz, Levy, Eisele and Richard

[57] ABSTRACT

A screen fixing device of a projection type television system including a projection unit comprises a fixing frame for detachably fixing a screen, the fixing frame being provided with a plurality of through holes each extending laterally of a front opening frame surround a front opening section at which the screen is provided, and a fastening screw penetrating each through hole for fixing the fixing frame to the front opening section of the projection unit. The fixing frame has substantially an L-shaped cross section at least at a portion through which the through hole is formed. Instead of the fixing frame, a fixing block may be used. The fixing device may comprise a plurality of first fixing members for detachably fixing the screen with a space with each other and a plurality of second fixing members for fixing the first fixing members to the front opening section of the projection unit. The first fixing members are formed of a transparent material. Each of the first fixing members and each of the second fixing members are fixed integrally together or formed integrally.

14 Claims, 10 Drawing Sheets

F I G. 2
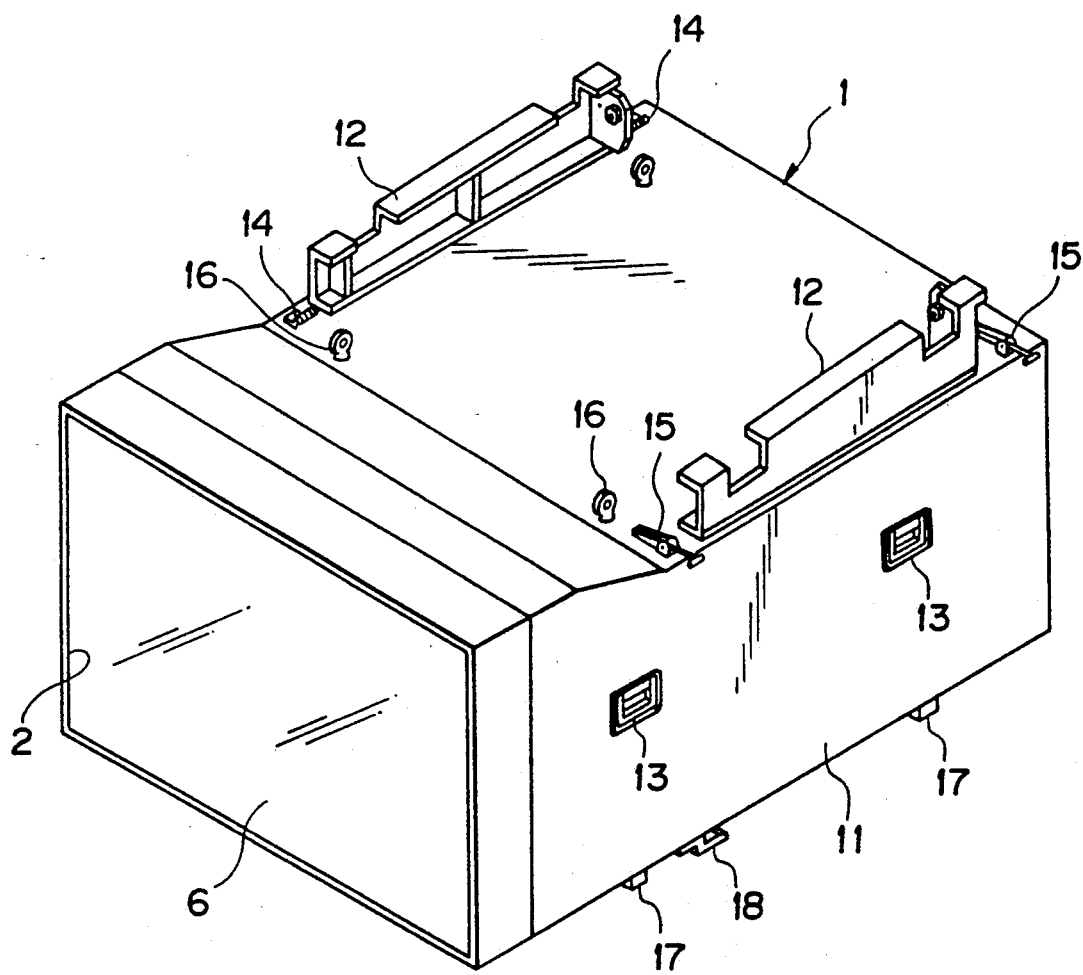

SCREEN FIXING DEVICE OF PROJECTION TYPE TELEVISION SYSTEM

BACKGROUND OF THE INVENTION

This invention relates to a screen fixing device of a projection type television (TV) system, and more particularly, to a screen fixing device detachably mounted to a front opening section of a multi projection type TV system comprising a plurality of projection type TV units arranged in matrix in vertical and horizontal directions.

In known technology, a multi projection type TV system having a large screen has been constituted by arranging a plurality of projection type TV units (called merely TV unit hereinlater) each having the same structure, each piled in matrix in the vertical and horizontal directions and each incorporating three cathode ray tubes (CRT) for three colors, i.e. red (R), green (G) and blue (B), and images from the CRTs are projected on the screen.

In a multi projection type TV system having the configuration as described above, it is generally known that a screen arranged in an opening section of a multi projection TV unit in a quickly removable manner is convenient for maintenance and inspection of components in the TV units such as CRTS. Also, by using a fixing frame, it is possible to absorb machining accuracy of a screen consisting of a Fresnel lens and a lenticular sheet or, in other words, a gap between the Fresnel lens and the lenticular sheet and the opening of the TV unit.

Conventionally, as shown in FIG. 15, a screen 6 consisting of a Fresnel lens 4 and lenticular sheet 5 is connected to a stopper piece 3 made of rubber and held in a front opening section 2 of a TV unit 1, and a fixing frame 7 is set around a front edge section of the screen 6 and then fixing screws 9 are screwed through holes 8 into taps arranged in two adjacent front opening frames 2a, 2a.

Accordingly, it is required to locate the two fixing frames having a width which allows absorption of changes in screen size due to machining accuracy or thermal expansion of the screen 6 in a fixed state of the screen 6. In a case where several tens of TV units are piled in matrix in vertical and horizontal directions, each unit can not be separated for the purpose of inspecting or repairing the same, but when it is required to check or repair components of the TV unit 1 such as CRTs without changing the TV system configuration, the components of the unit 1 can be checked or repaired by loosening the fixing screws 9, removing the fixing frames 7 and then removing the screen 6 from the front opening frames 2a of the TV unit 1. When the screen 6 of a certain TV unit 1 is broken, the screen can be replaced with a new one with the TV system being set.

In the conventional type of screen fixing device of the character described above, however, the cross section of the fixing frames have an approximately rectangular form and cover the end face of the front opening frames 2a of the TV units 1. Therefore, when a multi projection type TV system is seen from a front position at an angle (for instance at 45 degrees), a width of the two adjacent fixing frames 7 becomes a width Wb which is larger than a width Wa of the two adjacent fixing frames 7 in comparison with a case when viewed from the front side. This makes it difficult to clearly observe images on the screen. It is conceivable to reduce an area of the cross section of the two adjacent fixing frames 7 in order to solve this problem, but due to fixing force of the fixing screws 9 and strength of the fixing frames, there is a limit in reducing the cross section of the fixing frames 7.

SUMMARY OF THE INVENTION

An object of this invention is to substantially eliminate defects or drawbacks encountered in the prior art and to provide a screen fixing device of a projection type television system capable of reducing a width and an area of a fixing section when viewed from an obliquely front side as much as possible while maintaining a mechanical strength of a fixing member.

This and other objects can be achieved according to this invention, in a first aspect, by providing a screen fixing device of a projection type television system including a projection unit having a front opening section in which an image is projected on a screen mounted onto a front opening frame, from a rear side thereof, comprising a fixing frame for detachably fixing the screen so as to abut against front side edges thereof, the fixing frame being provided with through holes each extending laterally of the front opening frame, and a fastening member penetrating each of the through holes for fixing the fixing frame to the front opening frame, the fixing frame having substantially an L-shaped cross section at least at a portion through which the through hole is formed.

In a preferred embodiment, the portion through which the through hole is formed, comprises a first piece abutting against a front surface of the screen and a second piece abutting against a side surface of the front opening frame, the through holes being formed in the second piece along its longitudinal direction with a space with each other.

The fixing frame may be formed of a triangular member.

In a second aspect, there is provided a screen fixing device of a projection type television system including a projection unit having a front opening section in which an image is projected on a screen mounted onto a front opening frame, from a rear side thereof, a first fixing member for detachably fixing the screen so as to abut against front side edges of the screen with a space in a longitudinal direction of the front opening frame; and a second fixing member formed with the first fixing member to form a fixing piece for fixing the first fixing member to the front opening frame, the first fixing member being formed of a transparent material.

In a preferred embodiment said first fixing member and said second fixing member are fixed integrally together or formed integrally.

According to these structures and characters of the screen fixing device of this invention, the fixing frame or the fixing members are fixed to the front edge section of the screen provided in the front opening section of the projection unit, and each of the fastening members is fixed through a through hole arranged in the fixing frame to the front opening frame surrounding the front opening section or the fixing pieces are fixed to the front opening frame. Accordingly, a screen is mounted on the front opening section of each unit with machining accuracy of the screen absorbed.

In a third aspect, there is provided a screen fixing device of a projection type television system including a projection unit having a front opening section in which an image is projected on a screen mounted onto a front opening frame, from a rear side thereof, comprising a fixing block for detachably fixing the screen in abutment against front surface thereof, said fixing block being provided with two pieces formed in an L-shape and a through hole formed in one of the two pieces thereof and a fastening member penetrating said through hole in said one of the two pieces for fixing said fixing block to the front opening frame of the projection unit in a state wherein the other piece abuts against the front surface of the screen.

In the first and third aspects, a width of an invisible area when the fixing frame is viewed at an angle can be minimized by forming an L-shaped cross section of the facing frame, which makes it easier for viewers to see images on the screen.

In the second aspect, by arranging fixing pieces at an appropriate interval and making the fixing piece with transparent material, a dot-like fixing section with a further smaller area can be formed, which reduces existence of the fixing section.

BRIEF DESCRIPTION OF THE DRAWINGS

For a better understanding of the present invention and to show how the same is carried out, reference will be first made, by way of preferred embodiments, to the accompanying drawings, in which:

FIG. 2 is a perspective view of a projection image unit;

DESCRIPTION OF THE PREFERRED EMBODIMENTS

Figure 1:
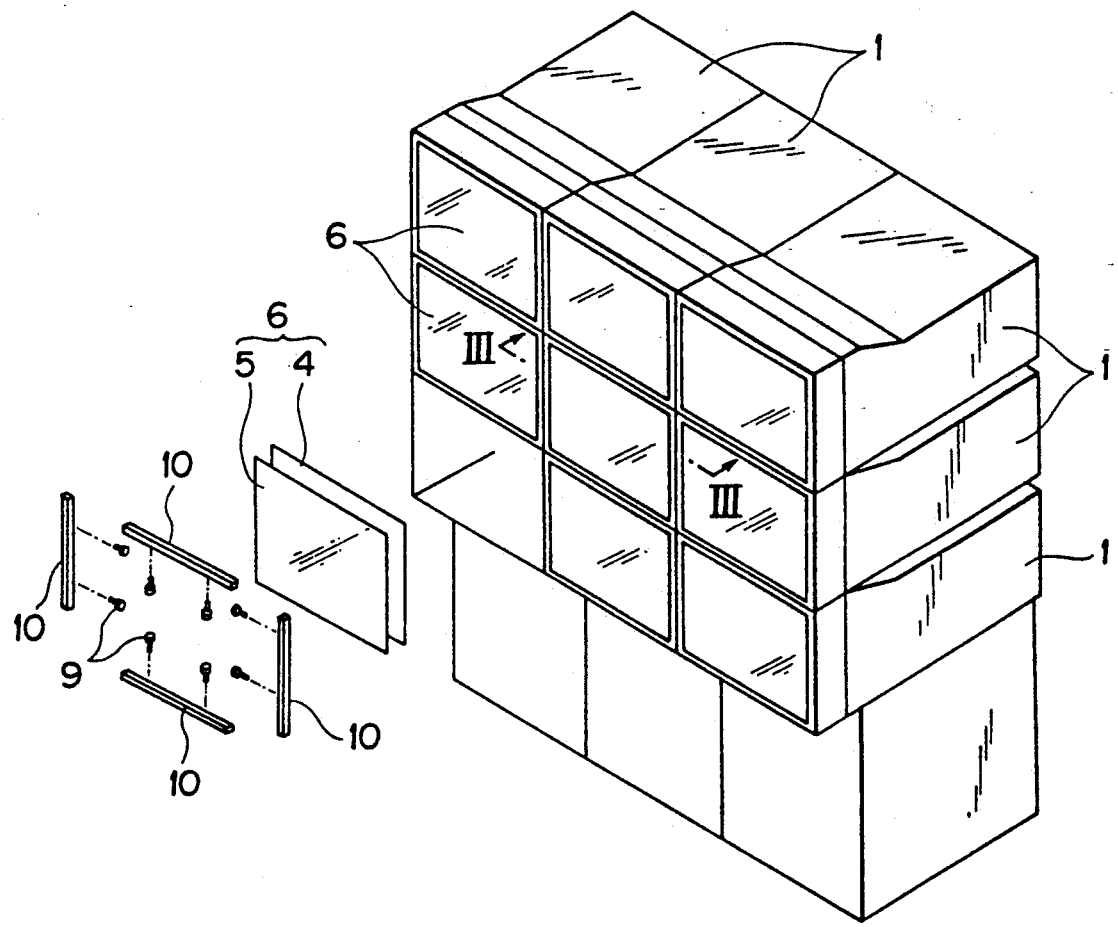
FIG. 1 is a perspective view of a multi projection type TV system having screen fixing devices according to a first embodiment of this invention.

A first embodiment of this invention will be described hereunder with reference to FIGS. 1 to 6 in which like reference numerals are added to members or elements corresponding to those of FIG. 15.

FIG. 1 is a perspective view showing a partially disassembled state of a multi projection type TV system having a plurality of screen fixing devices according to the first invention.

Referring to FIG. 1, the multi projection type TV system comprises a plurality of (nine in the illustration of FIG. 1) TV units 1 arranged in vertical and horizontal directions in a piled manner, each of the TV units 1 incorporating three CRTS, not shown, for RGB colors and projecting images from the CRTs on a screen 6 including a Fresnel lens 4 and a lenticular sheet 5.

Each of the TV units 1 comprises, as shown in FIG. 2, an aluminium casing 11, three CRTs for RGB colors incorporated in a rear section of the casing 11 and the screen 6 consisting of the lenticular sheet or lens 5 engaged with a front opening section 2 on the front side of the casing 11 and the Fresnel lens 4 arranged on the back side thereof.

At both edges of the top surface of the casing 11 are arranged a pair of connecting members 12 used for connection between the respective units I in a piled state, and on the right and left side surfaces of the casing 11 are arranged two handles 13 for carrying the unit at two positions, respectively. Furthermore, at one edge of the top surface of the casing 11 is arranged an adjust fastener 15 which engages with a stopper 14 arranged an another edge of the top surface of the casing 11 of the units adjoining on the right or left side. The units I adjoining each other in horizontal direction are connected by the adjust fastener 15 and the stopper 14.

Furthermore, on the top surface of the casing 11 are arranged a plurality of rings 16 for hoisting the unit 1, and on the bottom surface of the casing 11 are arranged a plurality of leg members 17 and hooks 18 for temporary setting.

On the other hand, as shown in FIGS. 3 to 6, a screen fixing device, according to this invention, is detachably mounted on a front opening frame 2a surrounding the front opening section 2 of each unit 1 and comprises a fixing frame 10 fixed to the front edge section of the screen 6 abutting against a rubber stopper piece 3 secured to the front opening frame 2a and fastening screws 9 screwed into taps (not shown) arranged in the front opening frame 2a of the unit 1 through holes 20 arranged in the fixing frame 10.

Two adjacent front opening frames 2a, 2a are superposed and one stopper piece 3 and one fixing frame 10 are provided with respect to one front opening frame 2a. To each of four sides of the screen 6 is fixed the fixing frame 10 to fasten the screen to the front opening frame 2a.

Figure 4:
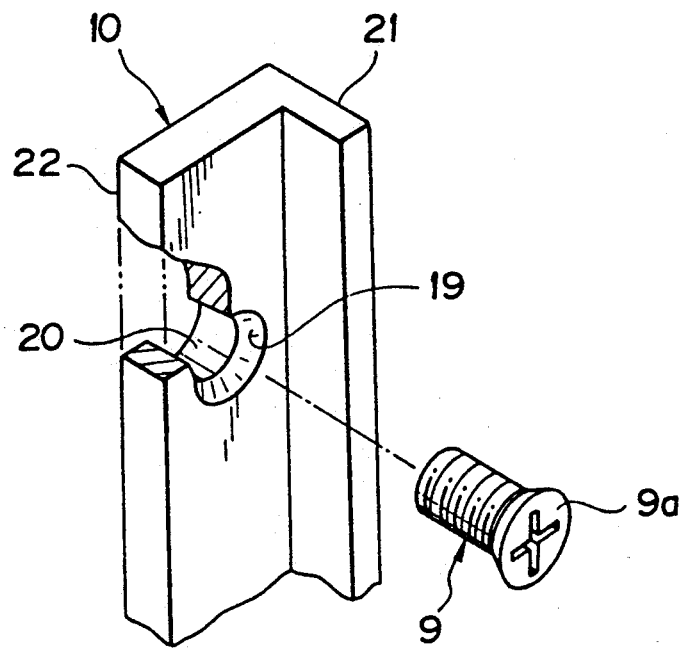
FIG. 4 is a partial perspective view showing a fixing frame and a fixing member according to this invention.

In this case, as shown in FIG. 4, the fixing frame 10 is formed with an angle member consisting of a first contact piece 21 which abuts against a front surface of the screen 6 and a second contact piece 22 which is flat and abuts against a side surface of the front opening frame 2a. The through holes 20 are arranged at an appropriate interval in the second contact piece 22 in its longitudinal direction. The outer surface of the through hole 20 is chamfered as shown by numeral 19, and when a fixing screw 9 having a plate like head section 9a is fixed, the surface of the plate like head section 9a becomes flush with the second contact piece 22, and an end face of the second contact piece 22 becomes flush with an end face of the opening frame 2a. For this reason, a width of the second contact piece 22 can be minimized, satisfying requirements for fastening force of the fastening screw 9 and strength of the fixing frame, and a width of the first contact piece 21 can be reduced in a range where it can prevent the screen 6 from dropping because of dimensional changes due to a machining error thereof or temperature change by the abutment of the front side edge of the screen 6.

Figure 15:
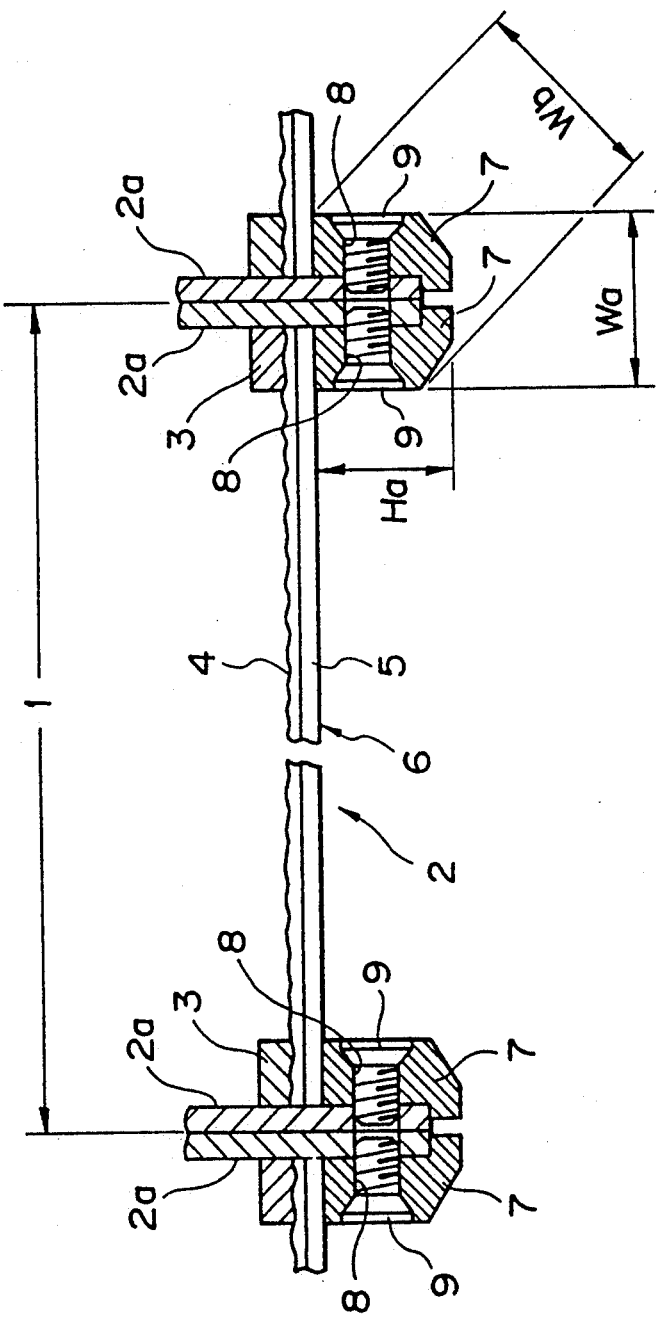
FIG. 15 is a cross sectional view of a conventional screen fixing device.

In comparison of a width Wo of the fixing frames 10 (concretely two fixing frames 10 adjoining each other in horizontal direction) when viewed from the front side at 45 degrees with a width Wb of the conventional fixing frames 7 of FIG. 15 when viewed from the front side at the same angle provided, the following result was obtained.

Description will now be made in comparison of the fixing frames 10 shown in FIG. 3 according to this invention with the conventional fixing frames 7 shown in FIG. 15.

In the conventional fixing frames 7.

* Width of the front side $Wa = 11$ mm
* Height $Ha$ projected from the screen $6 = 9$ mm
* Width $Wb$ when viewed from the front side at 45 degrees = 12.73 mm and, in the fixing frames 10 according to this invention.
* Width $Wd$ of the front side = 10.2 mm
* Height $Hb$ projected from the screen $6 = 5$ mm
* Width $Wc$ when viewed from the front side at 45 degrees = 9.33 mm;

As described above, the width Wc when viewed from the front side at 45 degrees could be reduced by about 27% in comparison with the width Wb.

Figure 5:
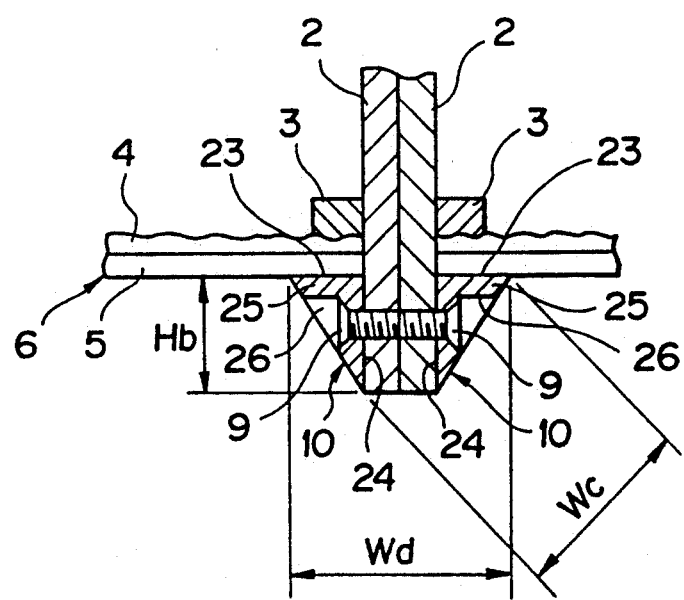
FIG. 5 is a cross section showing other form of the first embodiment.
Figure 6:
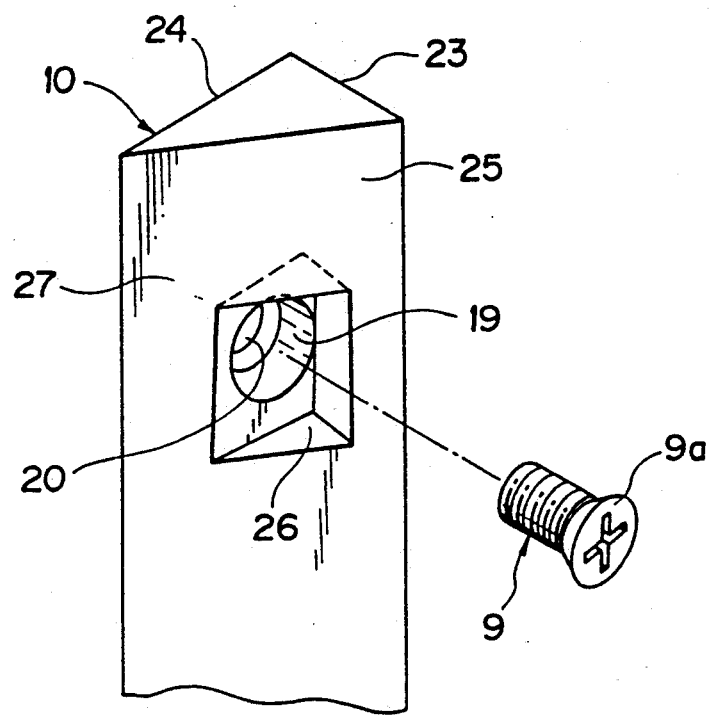
FIG. 6 is a perspective view showing other form of the fixing frame according to this invention.
Figure 7:
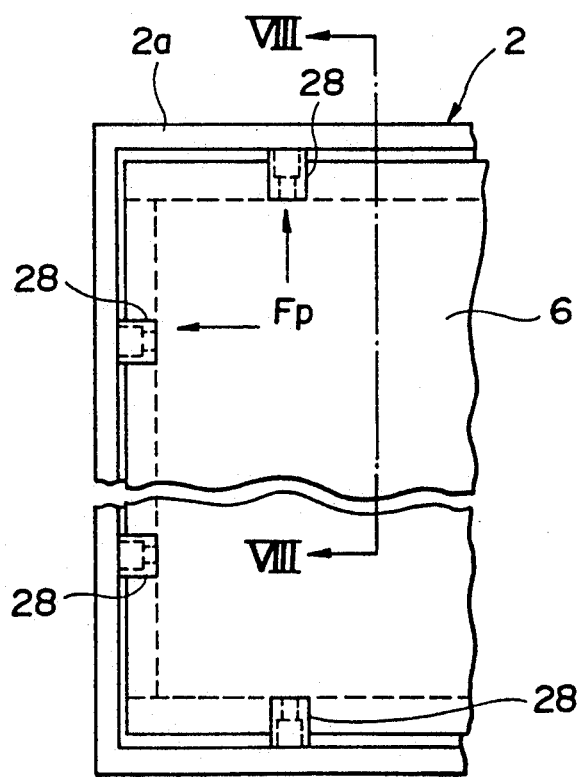
FIG. 7 is a partial front view showing a section of a fixing device when it is used, according to a second embodiment of this invention.
Figure 8:
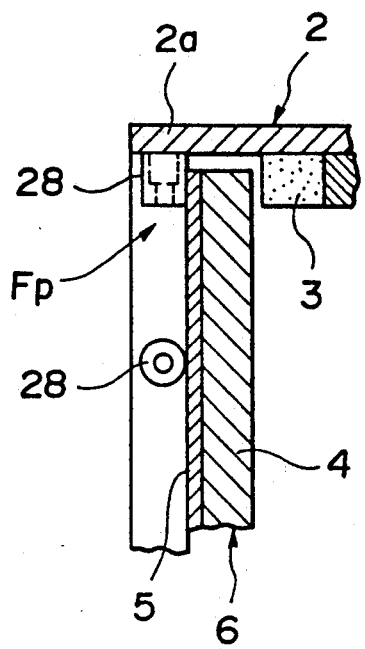
FIG. 8 is a cross section taken along the line VIII—VIII of the section shown in FIG. 7.

In the embodiment described above, the fixing frame 10 is made of an angle member having an L-shaped cross section, but the fixing frame is not always limited to the angle member, and for instance, as shown in FIGS. 5 and 6, it may be formed with a triangle pole member 25 having a first surface 23 abutting against the front edge of the screen 6, a second surface 24 abutting against the side surface of the front opening frame 2a with a plurality of through holes 20 at an appropriate interval in the longitudinal direction of the triangle pole member 25, a third surface 27 extended obliquely between the first and second surfaces 23, 24. Each through hole 20 is communicated with a counter bore 26 formed so as to cut the third surface 27. The cross section of the member 25 in which the through hole is formed may be formed in substantially an L-shape. In this case, a chamfered portion 19 is formed in the outer side of the through hole 20, as formed in the angle member 10.

Figure 3:
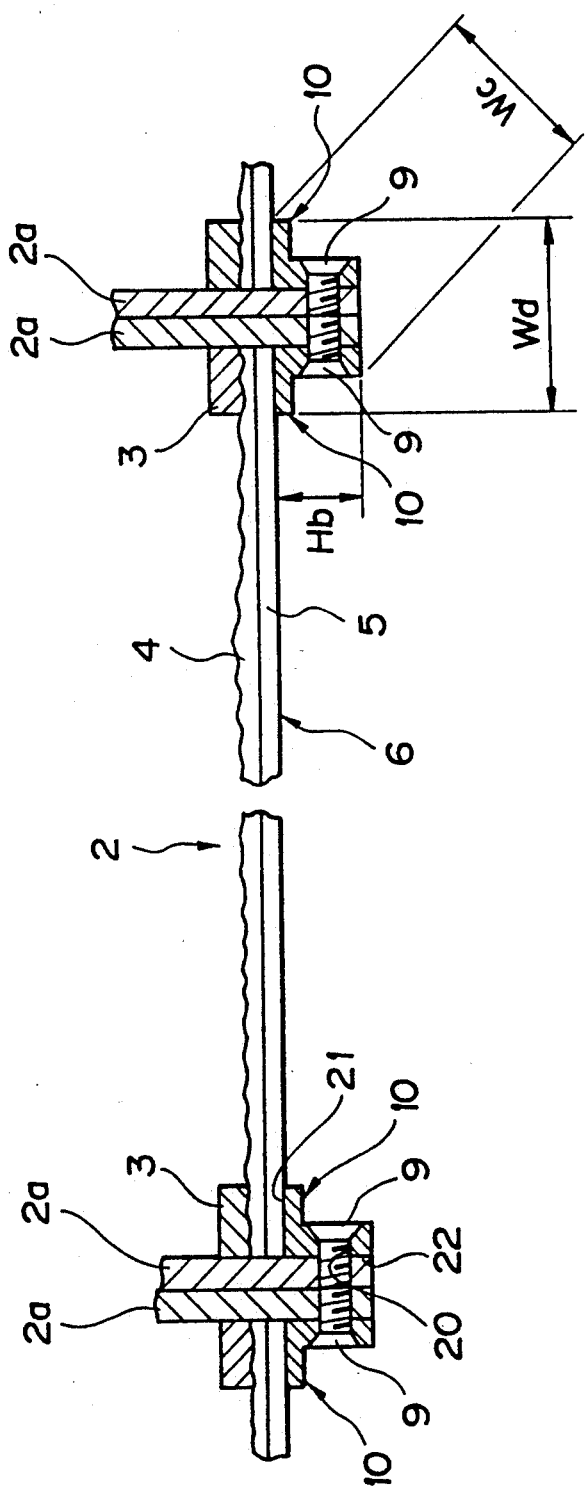
FIG. 3 is a cross section taken along the line III—III of the system shown in FIG. 1.

Referring to FIGS. 5 and 6, like reference numerals are added to members or portions corresponding to those shown in FIGS. 3 and 4, and the description thereof is omitted.

A second embodiment of this invention will be described hereunder with reference to FIGS. 7 to 10.

The second embodiment represents a case where an area of the fixing section of the fixing device is further reduced to minimize the feeling of existence of the fixing section, which makes it easier for viewers to see images on the screen. In other words, the fixing device comprises a plurality of first fixing members 28, 28 . . . 28 abutting against the front edge section of the screen 6 detachably mounted on the front opening section 2 of the unit 1 and a plurality of second fixing members 30 fastening the first fixing members 28 to the front opening section 2 of the unit 1, at least the first fixing members 28 being made of a transparent material. The first and second fixing members 28, 30 form a fixing piece $F_p$.

Figure 9:
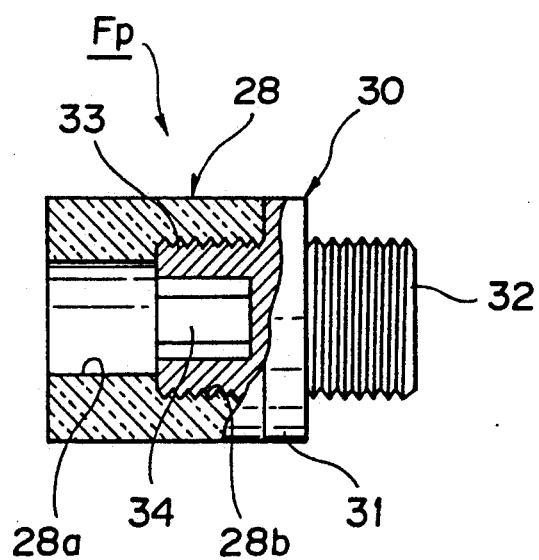
FIG. 9 is a cross section showing a fixing piece according to this invention.
Figure 10:
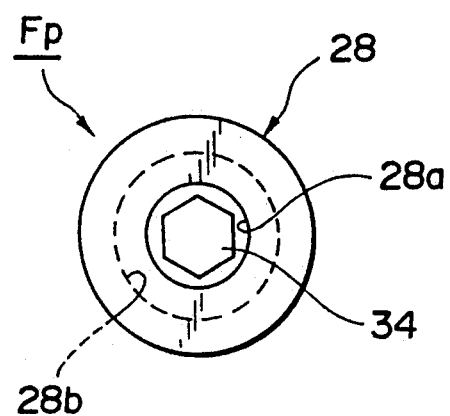
FIG. 10 is a side view of the section shown in FIG. 9.

As shown in FIGS. 9 and 10, each of the first fixing member 28 is formed with a cylindrical member made of, for instance, transparent ABS resin. The second fixing member 30 is fitted into a large bore portion 28b of a stepped through hole 28a formed in the cylindrical member 28. In this case, the first fixing member 30 is made of metallic material plated with, for instance, zinc. A fixing screw portion 32 is screwed into the front opening frame 2a of the front opening section 2 and projected from one surface of a flange 31. A fixing screw portion 33 is fitted into the large bore portion 28b in the cylindrical member 28 and projected from the other surface of the flange portion 31 with a hexagonal hole 34 formed in a front end surface of the fixing screw portion 33 for a hexagonal wrench (not shown) to be engaged with. The fixing screw portion 33 and the large bore portion 28b are fixed to each other by means of, for instance, super sonic welding or insert formation in a heated state. The fixing screw portion 33 may be formed into a cylindrical shape with no screws.

In order to fix the screen 6 by setting the fixing pieces $F_p$, formed as described above, in the front opening section 2 of the unit 1, at first the fixing screw portion 32 of the first fixing screw member 30 is aligned with a preliminarily formed screw hole (not shown) formed at an appropriate interval in the front opening frame 2a. In this state, a hexagonal wrench is inserted into the hexagonal hole 34 of the fixing screw member 30 through the through hole 28a of the cylindrical member 28 and then turned to screw the fixing screw portion 32 into the screw hole, whereby the side surface of the cylindrical member 28 abuts against the front side section of the screen 6 to thereby fix the same.

Accordingly, as the front edge section of the screen 6 can be fixed at dot-like small sections, an area of each ficing portion can be minimized, and furthermore, since the cylindrical member, i.e. the first fixing member 28, can be made of a transparent material, the feeling of existence of the first fixing member 28 can be reduced and it makes further easier for viewers to see images on the screen.

Figure 11:
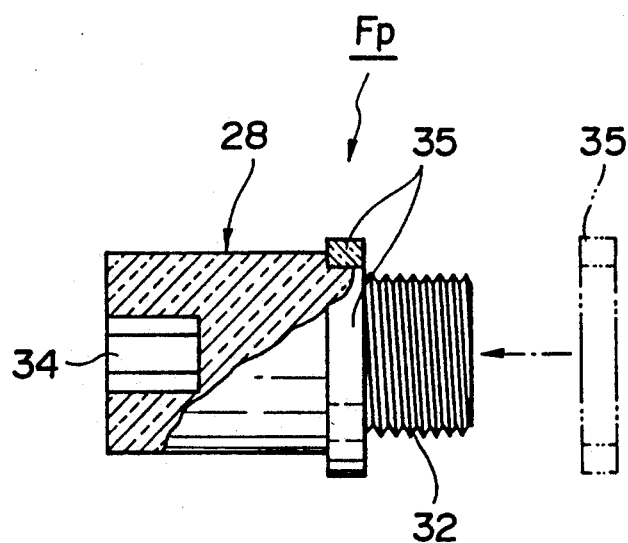
FIG. 11 is a cross section showing other form of the fixing piece according to this invention.
Figure 12:
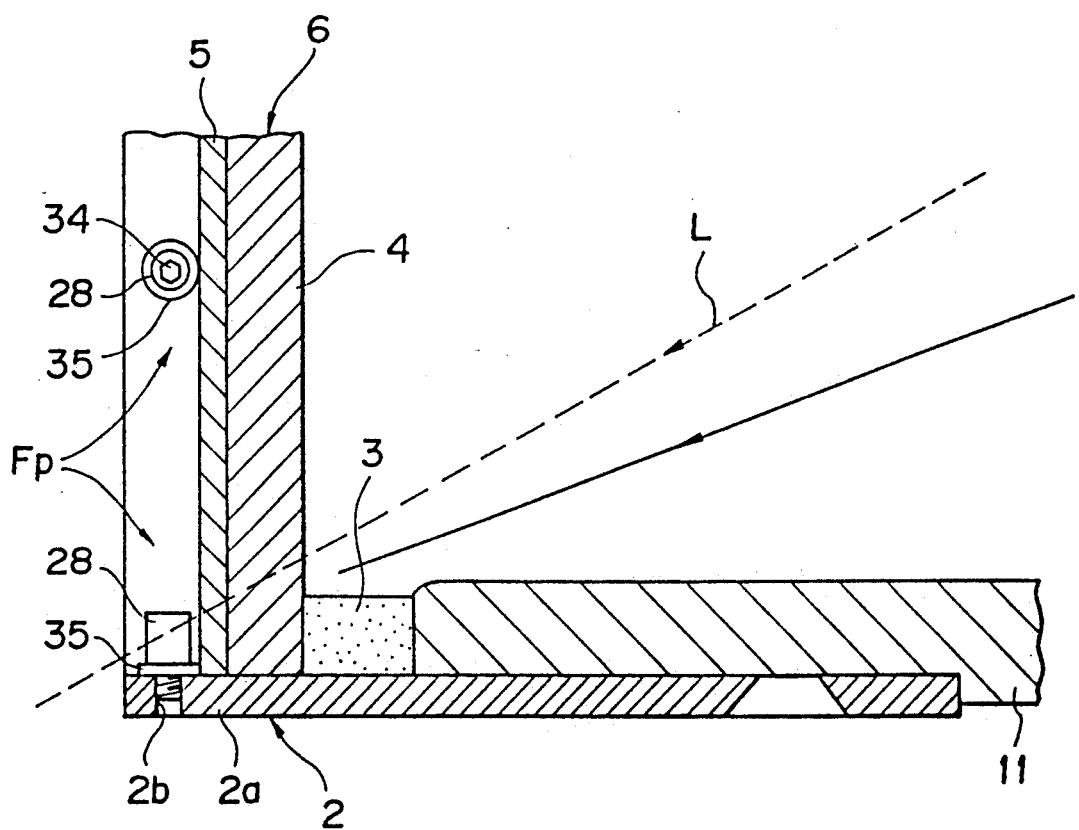
FIG. 12 is a section of a TV unit, showing a state of the fixing piece shown in FIG. 11 when viewed from the top surface side.

In the aforementioned embodiment, the first and second fixing members 28, 30 are forred independently and fixed to each other, but this type of configuration is not always required, and for instance, as shown in FIG. 11, the fixing screw portion 32 may be formed integrally with the first fixing member 28 formed with a cylindrical member made of transparent ABC resin like in the above case. In this case, strength of the first fixing member 28 can be maintained by fastening the fixing piece $F_p$ into the screw hole 2b (FIG. 12) in the front opening frame 2a with a zinc plated washer 35 set on the root portion of the fixing screw portion 32. The outer peripheral surface of the washer 35 is projected from the outer peripheral surface of the first fixing member 28. Therefore, the outer projected surface thereof abuts against the side edge of the screen 6 when the fixing piece $F_p$ is used as shown in FIG. 12. The hexagonal hole 34 is formed on the edge side of the first fixing member 28 and the fixing screw portion 32 of the fixing piece $F_p$ can be screwed into the screw hole 2b (FIG. 12) in the opening frame 2a with a hexagonal wrench like in the above case. In such a case, although the first fixing member 28 has a cylindrical form, the form is not always limited to a cylindrical one and a square rod block such as a square pole may be allowable. Furthermore, a symbol L shown with a dotted line in FIG. 12 shows a light beam from an incorporated CRT and the light beam goes through the fixing piece 28.

Figure 13:
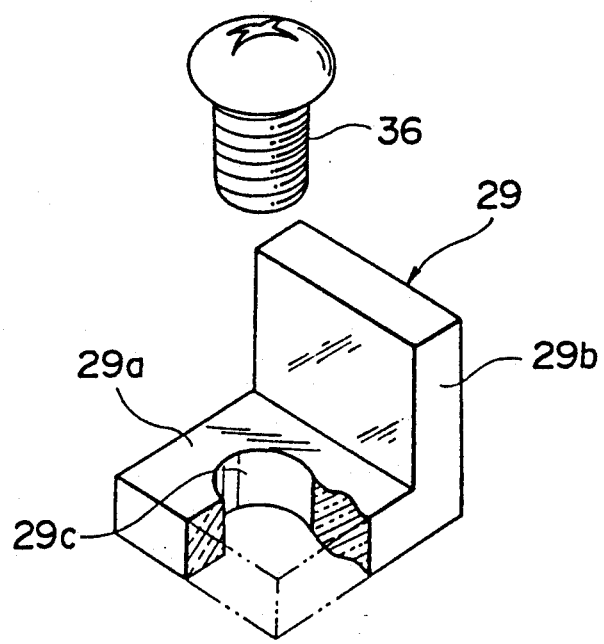
FIG. 13 is a disassembled perspective view showing still another form of the fixing piece according to this invention.
Figure 14:
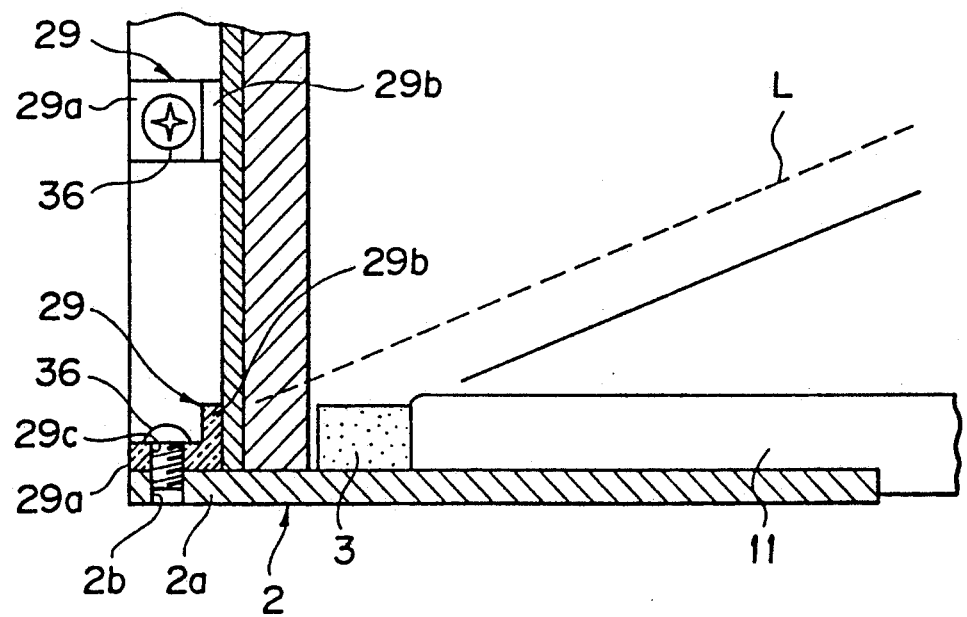
FIG. 14 is a section of the TV unit, showing a state where the fixing piece shown in FIG. 13 is viewed from the front side of the unit.

In addition, it may be possible to form a filling block 29 and a screw 36 integrally or independently. Namely, the fixing block 29 is formed with an angle member made of transparent ABC resin, as shown in FIG. 13, and a mounting hole 29c is formed in a first piece 29a abutting against the front opening frame 2a. Then, by screwing a fastening screw 36, which is a fastening means, through the mounting hole 29c, into the screw hole 2b in the front opening frame 2a, a second piece 29b abuts against the front side portion of the screen 6, thus said screen 6 being fixed (FIG. 14). The feeling of existence of the fixing frame or angle member 29 due to reflection of light in a particular direction will be reduced by minimizing the size of this angle block 29. The form of the fixing block 29 is not limited to the angular one and the fixing block having a triangle cross section, for instance, may be utilized.

Regarding the other structures of the second embodiment, like reference numerals are added to members on portions corresponding to those referred to with respect to the first embodiment and description thereof is omitted.

In the above embodiments, this invention is applied to a multi projection type TV system wherein a plurality of multiple projection units are arrayed in vertical and horizontal directions, but applications of this invention are not limited to those described above. In other words, this invention can also be applied to fix a screen of a large screen projection type TV system.

What is claimed is:

1. A screen fixing device for projection units of a projection type television system including a plurality of projection units, each of said projection units having a front opening section which constitutes a front portion of a casing and to which a screen is detachably mounted so as to project an image on the screen from a rear side thereof said screen fixing device comprising:
   a front opening frame to which the screen is to be fastened, said front opening frame having a portion extending out from a front surface of the screen and surrounding an outer periphery of the screen,
   a stopper piece mounted on the front opening frame so as to support the front opening frame from a back side thereof;
   a fixing frame for detachably fixing the screen in abutment against a front surface thereof, said fixing frame having substantially an L-shaped cross section having a first contact piece abutting against the front surface of the screen so as to support the screen from a front side thereof and a second contact piece abutting against a side surface of the front opening frame, said second contact piece having a height extending from the front surface of the screen no greater than a height of the front opening frame extending from the front surface of the screen, said fixing frame being provided with a plurality of through holes open to the fixing frame and the front opening frame and each extending laterally thereof so as to abut and fix the second contact piece of the fixing frame and the front opening frame; and
   a fastening member extending through each of the through holes for detachably fixing the fixing frame to the front opening frame of the projection unit.

2. A screen fixing device according to claim 1, wherein said second piece comprises a flat piece.

3. A screen fixing device according to claim 1, wherein said fastening member comprises a screw member having a threaded portion and a screw head and wherein each of said through hole is provided with a threaded portion and a portion for accommodating the screw head of the screw member when screwed so that outer surface of the second piece is substantially flush with a top surface of the screw head.

4. A screen fixing device for each projection unit of a projection type television system including a plurality of the projection units each having a front opening section in which an image is projected on a screen mounted onto a front opening frame, from a rear side thereof; comprising:
   a front opening frame to which the screen is to be fastened, said front opening frame having a portion extending out from a front surface of the screen and surrounding an outer periphery of the screen
   a fixing frame for detachably fixing the screen in abutment against a front surface thereof; said fixing frame being provided with a plurality of through holes each extending laterally thereof, and
   a fastening member extending through each of said through holes for fixing said fixing frame to the front opening frame of the projection unit,
   said fixing frame comprising a triangular member in cross section of the corner of the front opening frame and the screen.

5. A screen fixing device according to claim 4, wherein a portion of the fixing frame through which a through hole is formed, comprises a first surface abutting against a front surface of the screen, a second surface abutting against a side surface of a front opening frame of a projection unit and a third surface extended obliquely between the first and second surfaces, said through holes being formed in a longitudinal direction of the fixing frame spaced from each other so as to extend from the third surface to the second surface.

6. A screen fixing device according to claim 4, wherein said fastening member comprises a screw member having a threaded portion and a screw head and wherein each of said through holes is provided with a threaded portion and a portion for accommodating the screw head of the screw member when screwed.

7. A screen fixing device according to claim 1, wherein said projection type television system includes a plurality of projection units arranged in matrix.

8. A screen fixing device for each projection unit of a projection type television system including a plurality of the projection units each having a front opening section in which an image is projected on a screen comprising:
   a front opening frame to which the screen is to be fastened, said front opening frame having a portion extending out from a front surface of the screen and surrounding an outer periphery of the screen
   a first fixing member for detachably fixing the screen so as to abut against a side edge of the screen; and
   a second fixing member formed with the first fixing member to form a fixing piece for fixing the first fixing member to the front opening frame of the unit,
   a side surface of one of said first and second fixing members disposed at the front side edge of the screen to fix the screen in the front opening section of the unit, said first fixing member being formed of a transparent material.

wherein said first fixing member comprises a columnar member having a stepped through hole having two small and large diameter portions, said second fixing member having a portion engaged with the large diameter portion of the through hole of the columnar member and the front opening frame being screwed therein.

9. A screen fixing device according to claim 8, wherein said transparent material of the first fixing member is a transparent ABS resin.

10. A screen fixing device according to claim 8, wherein said first fixing member and said second fixing member are fixed together.

11. A screen fixing device according to claim 8, wherein said columnar member and said second fixing member are connected through a screw engagement.

12. A screen fixing device according to claim 8, wherein said first fixing member and said second fixing member are integrally formed.

13. A screen fixing device according to claim 8, wherein said projection type television system includes a plurality of projection units arranged in matrix.

14. A screen fixing device of every projection unit of a projection type television system including a plurality of projection units each having a front opening section which constitutes a front portion of a casing and to which a screen is detachably mounted so as to project an image on the screen from a rear side thereof, comprising:

a front opening frame to which the screen is to be fastened, said front opening frame having a portion extending out a front surface of the screen and surrounding an outer periphery of the screen, a stopper piece mounted on the front opening frame so as to support the frame from a back side thereof;

a fixing frame for detachably fixing the screen in abutment against a front surface thereof, said fixing frame having substantially an L-shaped cross section having a first contact piece abutting against the front surface of the screen so as to support the screen from a front side thereof and a second contact piece abutting against a side surface of the front opening frame, said second contact piece having a height standing out the front surface of the screen equal to or smaller than a height extending from the front surface of the screen, said fixing block being provided with a through hole being opened to the second piece of the fixing block and the front opening frame each extending laterally thereof so as to abut and fix the second contact piece of the fixing block and the front opening frame; and a fastening member penetrating the through hole for detachably fixing the fixing block to the front opening frame of the projection unit.

* * * * *